(12) United States Patent
Kritt et al.

(10) Patent No.: US 9,507,790 B2
(45) Date of Patent: Nov. 29, 2016

(54) PROVIDING FILE INDEXES AND PER-FILE VIEWING MODES WITHIN A FILE MANAGEMENT APPLICATION

(71) Applicant: LENOVO Enterprise Solutions (Singapore) PTE, Ltd., New Tech Park (SG)

(72) Inventors: Barry Alan Kritt, Raleigh, NC (US); Sarbajit K. Rakshit, West Bengal (IN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 592 days.

(21) Appl. No.: 13/669,536

(22) Filed: Nov. 6, 2012

(65) Prior Publication Data

US 2014/0129564 A1 May 8, 2014

(51) Int. Cl.
*G06F 17/30* (2006.01)
*G06F 3/0482* (2013.01)

(52) U.S. Cl.
CPC ....... *G06F 17/30126* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 5,652,876 A | 7/1997 | Ashe et al. | |
| 7,127,676 B2 | 10/2006 | Linsey et al. | |
| 7,730,428 B1 * | 6/2010 | Yehuda et al. | 715/853 |
| 2005/0076312 A1 * | 4/2005 | Gardner | G06F 3/0482 |
| | | | 715/853 |
| 2005/0246647 A1 * | 11/2005 | Beam et al. | 715/747 |
| 2005/0289109 A1 * | 12/2005 | Arrouye et al. | 707/1 |
| 2006/0080269 A1 * | 4/2006 | MacLaurin | 706/45 |
| 2007/0078674 A1 * | 4/2007 | Weinberg | G06F 19/321 |
| | | | 715/817 |
| 2008/0189647 A1 | 8/2008 | Tapuska | |
| 2008/0307343 A1 * | 12/2008 | Robert et al. | 715/765 |
| 2009/0106696 A1 * | 4/2009 | Duarte | G06F 3/0482 |
| | | | 715/828 |
| 2010/0211905 A1 * | 8/2010 | Unz | G06F 17/30893 |
| | | | 715/776 |
| 2010/0241648 A1 * | 9/2010 | Ito et al. | 707/765 |
| 2010/0318518 A1 * | 12/2010 | Kim | 707/741 |
| 2011/0131534 A1 | 6/2011 | Subramanian et al. | |

* cited by examiner

*Primary Examiner* — James Trujillo
*Assistant Examiner* — Aida Tessema
(74) *Attorney, Agent, or Firm* — Kunzler Law Group; Katherine Brown

(57) ABSTRACT

Various embodiments present file indexes within a file managing and navigation interface. In one embodiment, a set of files is presented within a user interface of a file managing and navigation application. A visual indicator is associated with at least one file in the set of files. The visual indicator indicates to a user that the at least one file is associated with an index. The index includes a set of index components associated with a content set of the at least one file. A request from the user to is received to display the index. The index is presented to the user within the user interface based on receiving the request.

11 Claims, 13 Drawing Sheets

| INDEX | | PAGE |
|---|---|---|
| I. | COVER | 1 - 2 |
| | a. COPYRIGHT PAGE | 2 |
| II. | CONTENTS OVERVIEW | 3 - 5 |
| III. | CONTENTS | 5 - 15 |
| IV. | INTRODUCTION | 16 - 30 |
| V. | CHAPTER 1 | 31 - 60 |
| VI. | CHAPTER 2 | 61 - 90 |
| | ⋮ | ⋮ |
| | CHAPTER N | |

FIG. 2

| 402 | 406 | 410 | 400 |
|---|---|---|---|
| FILE | INDEX | INDEX LOCATION | ... |
| FILE A 402 | YES 408 | WITHIN FILE 412 | ... |
| FILE B | NO | N/A | ... |
| ... | ... | ... | ... |
| FILE N | YES | LOCATION A | ... |

FIG. 4

| File | Current Viewing State | ... |
|---|---|---|
| File A | DETAILED | ... |
| File B | DETAILED | ... |
| File C | THUMBNAIL | ... |
| File D | THUMBNAIL | ... |
| File E | THUMBNAIL | ... |
| File F | DETAILED | |
| ... | ... | ... |
| File N | DETAILED | ... |

FIG. 9

| File | Current Viewing State | ... |
|---|---|---|
| File A 704 | DETAILED 708 | ... |
| File B | DETAILED | ... |
| File C | DETAILED | ... |
| File D | DETAILED | ... |
| File E | DETAILED | ... |
| File F | DETAILED | |
| ... | ... | ... |
| File N | DETAILED | ... |

FIG. 7

PROVIDING FILE INDEXES AND PER-FILE VIEWING MODES WITHIN A FILE MANAGEMENT APPLICATION

BACKGROUND

The present invention relates to file management and navigation within a computing environment.

File management and navigation applications generally provide users with an interface to explore files and folders within a computing environment. For example, a user is able to view files and folders stored on (or coupled to) the user's computer. The user can move, delete, add, and rename files and folders through the interface provided by the application. A user can also view information such as file name, date of creation/modification, file type, etc. associated with various files and folders. However, the amount of information provided about a file is generally limited in conventional file management/navigation applications. Also, many of the operations provided by these conventional applications can only be applied globally to all files being currently displayed.

BRIEF SUMMARY

In one embodiment, a method, with an information processing system, for presenting file indexes within a file managing and navigation interface is disclosed. The method comprises presenting a set of files within a user interface of a file managing and navigation application. A visual indicator is associated with at least one file in the set of files. The visual indicator indicates to a user that the at least one file is associated with an index. The index comprises a set of index components associated with a content set of the at least one file. A request from the user to is received to display the index. The index is presented to the user within the user interface based on receiving the request.

In another embodiment, a computer program storage product for presenting file indexes within a file managing and navigation interface is disclosed. The computer program storage product comprises instructions configured to perform a method. The method comprises presenting a set of files within a user interface of a file managing and navigation application. A visual indicator is associated with at least one file in the set of files. The visual indicator indicates to a user that the at least one file is associated with an index. The index comprises a set of index components associated with a content set of the at least one file. A request from the user to is received to display the index. The index is presented to the user within the user interface based on receiving the request.

In yet another embodiment, a method, with an information processing system, for managing a viewing mode of a file managing and navigation interface is disclosed. The method comprises presenting a set of files within a user interface of a file managing and navigation application. The set of files are presented in a first viewing mode. A selection of at least one file in the set of files is received from a user. A selection of a second viewing mode associated with the at least one file is received from the user. A current viewing mode of the at least one file is changed from the first viewing mode to the second viewing mode. A current viewing mode of each remaining file in the set of files remains in the first viewing mode.

In a further embodiment, a computer program storage product for managing a viewing mode of a file managing and navigation interface is disclosed. The computer program storage product comprises instructions configured to perform a method. The method comprises presenting a set of files within a user interface of a file managing and navigation application. The set of files are presented in a first viewing mode. A selection of at least one file in the set of files is received from a user. A selection of a second viewing mode associated with the at least one file is received from the user. A current viewing mode of the at least one file is changed from the first viewing mode to the second viewing mode. A current viewing mode of each remaining file in the set of files remains in the first viewing mode.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates one example of a file index according to one embodiment of the present invention;

FIG. 4 shows one example of index tracking information according to one embodiment of the present invention;

FIG. 7 shows one example of file viewing mode state information according to one embodiment of the present invention;

FIG. 9 shows file viewing mode state information of FIG. 7 after it has been updated to include the new viewing mode associated with a subset of the files according to one embodiment of the present invention;

DETAILED DESCRIPTION

Operating Environment

Figure 1:
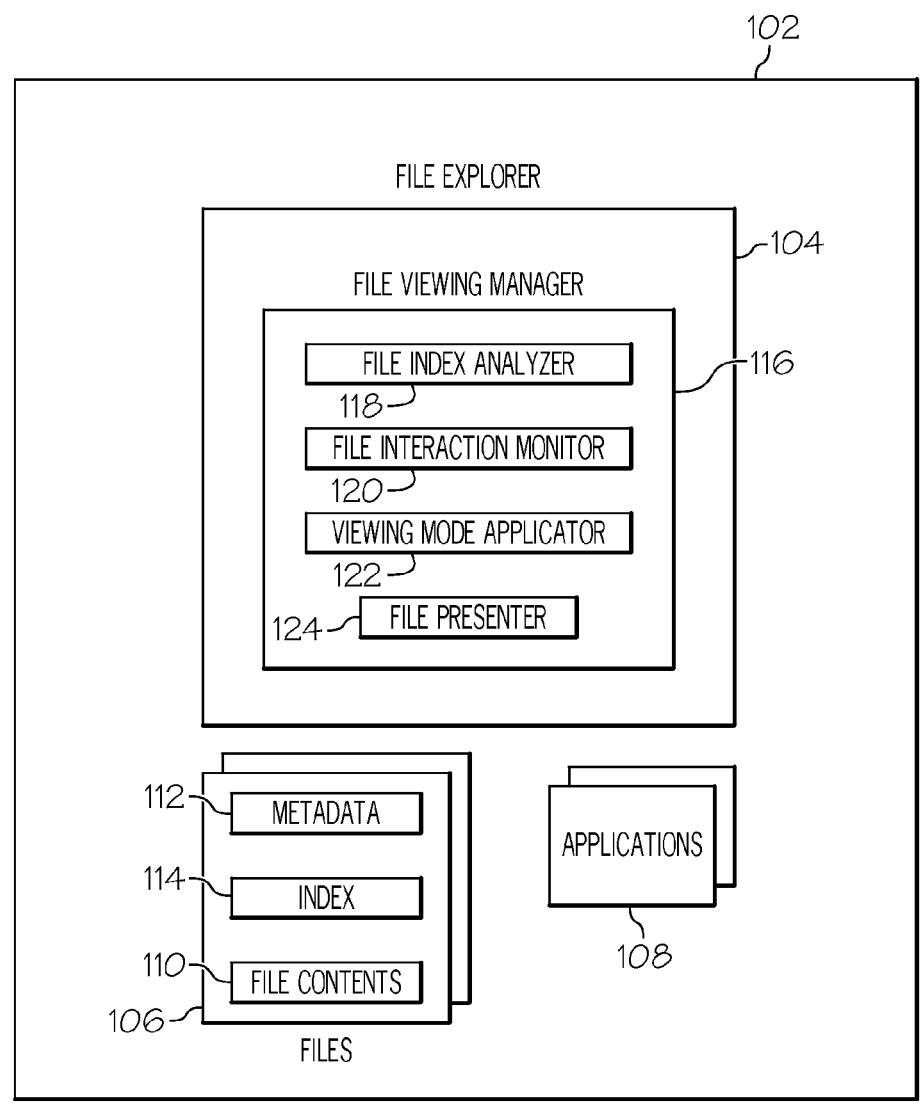
FIG. 1 is a block diagram illustrating one example of an operating environment according to one embodiment of the present invention.

FIG. 1 shows one example of an operating environment 100 for managing digital folder/file viewing and navigating within a viewing/navigation tool. In particular, FIG. 1 shows an information processing 102 system such as (but not limited to) a desktop computer, a laptop computer, a servers a wireless device (e.g., a mobile phone, a tablet, a gaming device, a personal digital assistant, etc.), and the like. The information processing system 102, in one embodiment, comprises a file/folder explorer 104. The file explorer 104 is a file manager and navigation application that allows users to view and manage (move, rename, add, delete, organize, etc.) the plurality of files 106. In one embodiment, the file explorer 104 comprises a file viewing manager 116 that manages the presentation of the plurality of files 106 (and folders) within the file explorer 104. The file viewing manager 116 can be part of or separate from the file explorer 104. In one embodiment, the file viewing manager 116 comprises a file index analyzer 118, a file interaction monitor 120, a viewing mode applicator 122, and a file presenter 124. The file viewing manager 116 and its components are discussed in greater detail below.

The information processing system 102 also comprises a plurality of files 106, and one or more applications 108. The plurality of files 106 can be stored locally on the information processing system 102 and/or on one or more other systems (not shown). The applications 108, in this embodiment, are applications that are associated with one or more of the plurality of files 106 and allow a user to interact with the contents 110 of a file and/or execute a file. For example, the applications 108 include (but are not limited to) word processing applications, media (photo, video, and/or audio) viewing/editing applications, etc.

In one embodiment, each of the plurality of files 106 are associated with metadata 112 such as, but not limited to, file size, date of creation, data and time of last modification, file type, authors, bit rate, camera model, and/or any other type of information that describes the file and/or its contents. One or more of the plurality of files 106 are also associated with at least one index 114. The index 114 identifies and/or describes various portions/sections of the file contents. In one example, the index 114 provides an organized structure such as (but not limited to) a table of contents that identifies and/or describes various portions/sections of the file contents 110. An index 114 can be stored within its associated file, or can be stored separate from its associated file. Also, an index 114 can be generated/created by a user, by the application 108 associated with file, by a separate indexing application, by the operation system, etc.

FIG. 2 shows one example of an index 200 associated with a document. The index 200 of FIG. 2 identifies/describes the content (e.g., the various parts/sections) of the document. In this example, the index 200 shows that the document comprises a "Cover" section 202 that comprises a "Copyright Page" section 204. The index also shows that the document comprises a "Contents Overview" section 206, a "Contents" section 208, an "Introduction" section 210, and various chapters 212, 214, 216. In addition, the index 200 also comprises additional information 218 such as page numbers associated with the content identified by the index 200.

Presenting an Index of a File within a Folder/File Explorer Tool

Figure 3:
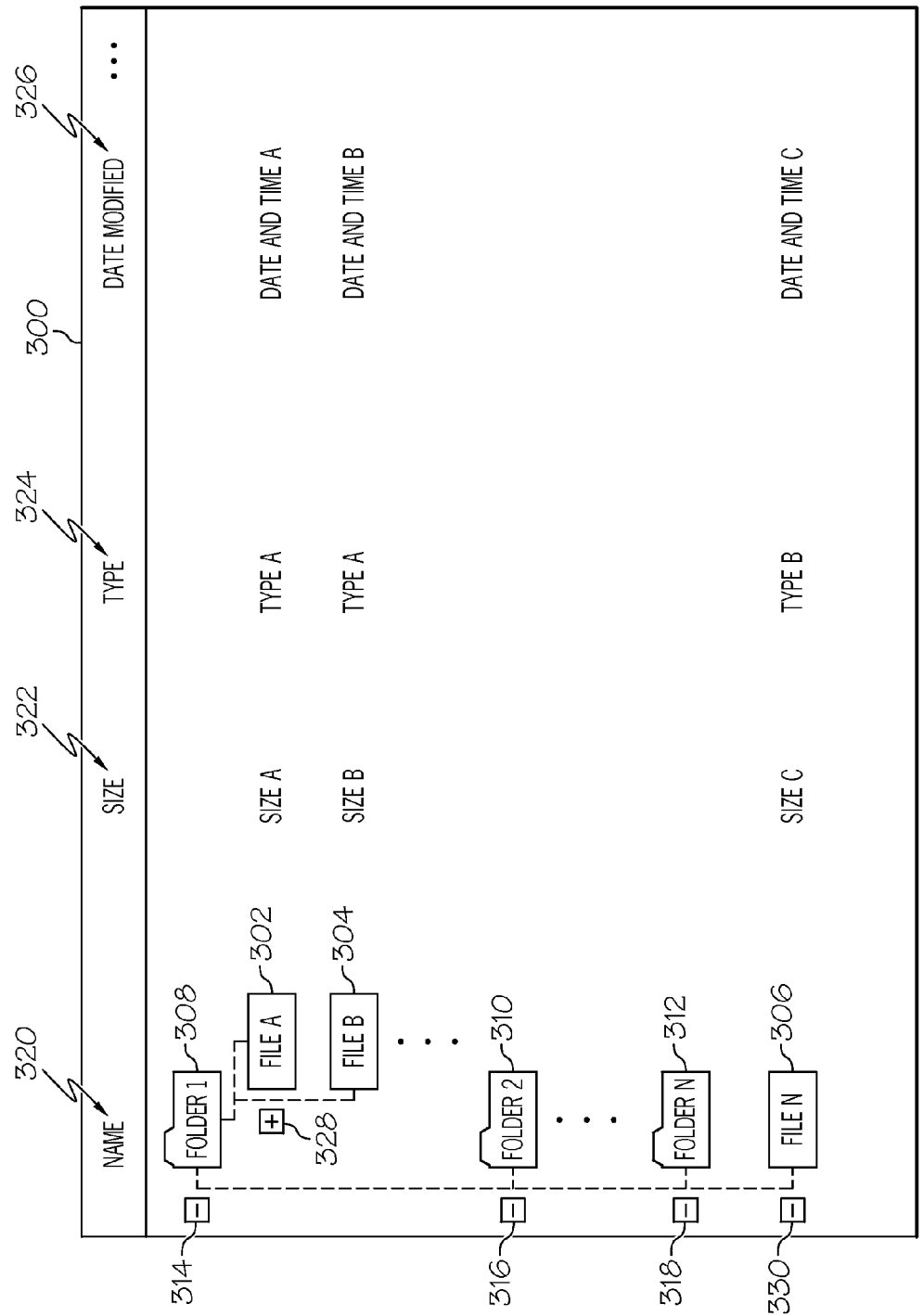
FIG. 3 shows one example of file managing and navigation interface for presenting a one or more files and their file indexes to a user according to one embodiment of the present invention.

As discussed above, the file explorer 104 allows users to view and manage the plurality of files 106 and their folders. For example, FIG. 3 shows one example of an interface 300 presented to the user by the file viewing manager 116 of the file explorer 104. In the example of FIG. 3 the file presenter 124 of the file viewing manager 116 presents/displays one or more of files 302, 304, 306 from the plurality of files 106 and optionally their folders 308, 310, 312 to the user. A folder, in one embodiment, is a virtual/logical container used to group and organize files in a digital environment.

The file viewing manager 116 indicates to the user that a folder 308, 310, 312 comprises one or more files via a visual indicator(s). For example, the file viewing manager 116 can visually change the icon, symbol, and/or text representing the folder to indicate the folder comprises one or more files. In another example the file viewing manager 116 presents a selectable visual indicator 314, 316, 318 associated with the folder 308, 310, 312 to indicate the folder comprises one or more files. It should be noted that a file is not required to be included within a folder. For example, FIG. 3 shows that File_N 306 is displayed within the interface 300 and is not associated with a folder. It should also be noted that although FIG. 3 shows a single interface 300 displaying a plurality of folders and files, separate interfaces can be displayed for each folder.

The user is able to select/click a visual indicator 314 to expand (or collapse) the view of the associated folder 308. For example, FIG. 3 shows that the displayed visual indicator 314 associated with Folder_1 308 has been selected resulting in the files 302, 304 associated with Folder_1 308 to be presented/displayed to the user. In one embodiment, the file presenter 124 displays a folder 308 and its files 302, 304, using a hierarchical structure such as (but not limited to) a tree structure with the folder being a parent/root node and the files being children/leaf nodes. The file viewing manager 116, in one embodiment, visually changes the indicator 314 to indicate that the user has expanded the folder 308. For example, the displayed symbol 314 can be changed from a "plus" sign to a "minus" sign. However, other visual changes are applicable as well. When displayed in the interface 300 a user can perform various functions on the files 302, 304, 306 (and folders 308, 310, 312). For example, the user can delete the folders/files, rename the folders/files, move the folders/files, open/execute the files, view the properties of the folders/files, etc.

Upon a subsequent selection of the indicator 314, the file viewing manager 116 collapses the hierarchal structure such that the files 302, 304 within the folder 308 are hidden. For example, FIG. 3 shows that Folder_3 310 is in a collapsed state and comprises files, as indicated by the "plus" sign within the visual indicator 316. It should be noted that other visual mechanisms for indicating that a folder is collapsed and comprises files are applicable as well.

In one embodiment, the file viewing manager 116 also displays, via the interface 300, metadata 112 associated with the displayed files 302, 304, 306 (and optionally folders) and their contents 110. For example, FIG. 3 shows that metadata such as the name 320, size 322, type 324, and modification information 326 associated with a given file is displayed to the user. The user is able to select the metadata that is displayed, and the position of the displayed metadata. The file presenter 124 can also organize the files 302, 304, 306 and folders 308, 310, 312 based on the metadata 112. For example, folders and files can be organized based on name, size, type, date of modification, etc.

In addition to the above, the file viewing manager 116 also presents file indexes to the user within the interface 300. In this embodiment, the file viewing manager 116 analyzes a file to determine if the file is associated with an index 114. This analysis process can be performed when the file is created, stored, presented within the interface 300, or at any other point in time. A file itself can comprise the index 114, or a file can comprise a flag and/or pointer that indicates the file is associated with an index 114. The flag/pointer can identify the location of the index 144 as well. If the file includes the index 114, the index 114 can be part of or separate from the metadata 112 of the file.

The file viewing manager 116, in one embodiment, maintains a set of index tracking information 400 to track/record which files are associated with an index 114, as shown in FIG. 4. For example, FIG. 4 shows a table comprising a first column 402 entitled "File". This column 402 comprises entries 404 identifying a given file. A file can be identified by its file name, a file ID, or any other form of identification. A second column 406, entitled "Index", comprises entries 408 indicating whether the file is associated with an index. A third column 410, entitled "Index Location", comprises entries 412 identifying the location of the associated index. For example, an entry under this column 410 can indicate that the index is located within the file itself or at a given location outside of the file (this location is stored within the entry). It should be noted that the file viewing manager 116 is not required to maintain the set of information 400 shown in FIG. 4.

In one embodiment, if a file is not associated with an index 114 the file viewing manager 116 can either create an index 114 for the file or request that an index 114 be created (if possible). In this embodiment, the file viewing manager 116 determines if the file is of a type for which an index 114 can be generated. If so, the file viewing manager 116 performs one or more indexing operations on the file to generate an index 114. These indexing operations, in one embodiment, identify the various parts/sections of the file; extract and/or generate one or more identifiers associated with these parts/sections; and optionally extract and/or generate a description associated with these parts/sections. This information is then stored as part of the index 114 associated with the file. In another embodiment, the file viewing manager 116 requests that operating system or another application, such as an indexing application or the application 108 associated with the file, perform the indexing operations. This generated index 114 can be stored as part of or separate from the file, as discussed above.

The file presenter 124 indicates to the user which files are associated with an index 114 via the interface 300 provided by the file viewing manager 116. For example, the presenter 124 visually changes the icon, symbol, and/or text representing the files associated with an index. In another embodiment, the presenter 124 displays an index indicator 328, 330 (e.g., an icon/symbol) associated with the files 302, 306 to indicate these files are associated with an index, as shown in FIG. 3. The file presenter 124 identifies the 302, 306 associated with an index based off of the index tracking information 400 discussed above. If the index tracking information 400 is not being maintained by the file viewing manager 116 the presenter 124 can determine if a file is associated with an index 114 by analyzing the file itself.

The user is able to select the index indicator 328, 330 or the representation of the file (e.g., icon, symbol, text, etc.) to display the index 114 associated with the file. This allows the user to view the indexed contents of the file without opening the file 302, 306. The presenter 124 displays the index by analyzing the index to identify each of the index components 202 to 216. The presenter 124 associates each of these index components with its file within the interface 300. When the user selects the index indicator 328, 330 associated with the file, the viewing state of File_A 202 is changed to an expanded state and the presenter 124 displays the index associated with the file.

Figure 5:
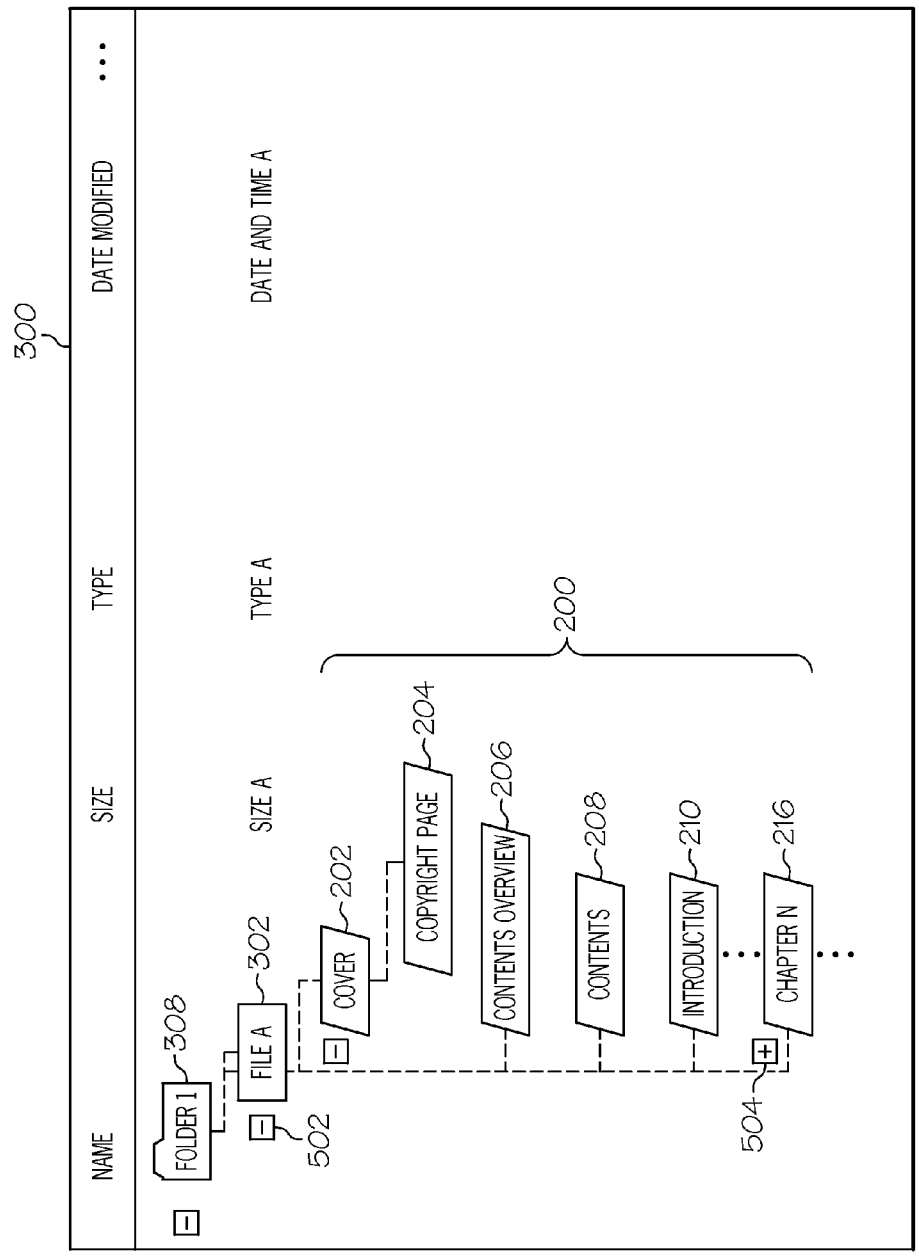
FIG. 5 shows one example of the interface of FIG. 3 after a user has selected an index indicator associated with a file according to one embodiment of the present invention.

FIG. 5 shows one example of the interface 300 presented by the file viewing manager 116 after the user has selected the index indicator 328 associated with File_A 302. In the example shown in FIG. 5 the presenter 124 has expanded the view of File_A 302 to present the index 200 of FIG. 2 to the user based on the user selecting the index indicator 328. In one embodiment, the index 200 is presented within the interface 300 using a hierarchical structure such as (but not limited to) a tree structure, where the file 302 associated with the index 200 is a parent/root node and the index components 202 to 216 are children/leaf nodes. Any subcomponent of an index component is displayed as a leaf/child of its parent component. For example, FIG. 5 shows that the index component "Cover" 202 has a subcomponent "Copyright Page" 204, which is displayed as a child/leaf of the "Cover" component 202.

The presenter 124 indicates to the user that an index component comprises one or more subcomponents via a visual indicator(s). For example, the presenter 124 can visually change the icon, symbol, and/or text representing the index component to indicate the index component comprises one or more sub-components. In another example the file viewing manager 116 presents a selectable visual indicator 502, 504 associated with an index component to indicate one or more subcomponents are included within the index component. When a user selects the visual indicator 502, 504 or the representation of the index component (e.g., icon, symbol, text, etc.) the viewing state of the index component is changed to an expanded state, which displays the sub-components to the user. A subsequent selection of the visual indicator 502, 504 (or the representation of the index component) changes the viewing state of the index component from an expanded viewing state to a collapsed viewing state, which hides the sub-components from view.

A user is able to select one or more of the displayed index components 212 to 216 and have the file opened at a page (or section) associated with the selected index component. For example, when a user selects an index component 210 such as "Introduction", the index analyzer 118 analyzes the index 200 and identifies a page number(s) (e.g., page 16) associated with the index component 210. The selection of the index component 210 invokes the application 1018 associated with the file 302. The file viewing manager 116 passes the identified page number(s) to the application 108, and the application 108 opens the document at the page number (e.g., page 16). It should be noted that the page number(s) can be identified by the index analyzer 118 prior to the user selecting the index component 210. Also, instead of sending the page number(s) to the application 108, the file viewing manager 116 can send an identifier (or identifying information) associated with selected index component 210 to the application. The application 108 uses this identifier (or identifying information) to determine a page(s) associated with the selected index component 210, and opens the file 302 at the given page. In another embodiment, the file viewing manager 116 provides a of a selected index component 210 within the interface 300 based on an initial selection action. A preview, for example, is a rendering of at least a portion of the file contents associated with the selected index component 210. The application 108 associated with the file 302 corresponding to the selected index component 210 can then be invoked upon a subsequent selection action performed on the index component 210.

Individual View Modes for Files and Folders

Figure 6:
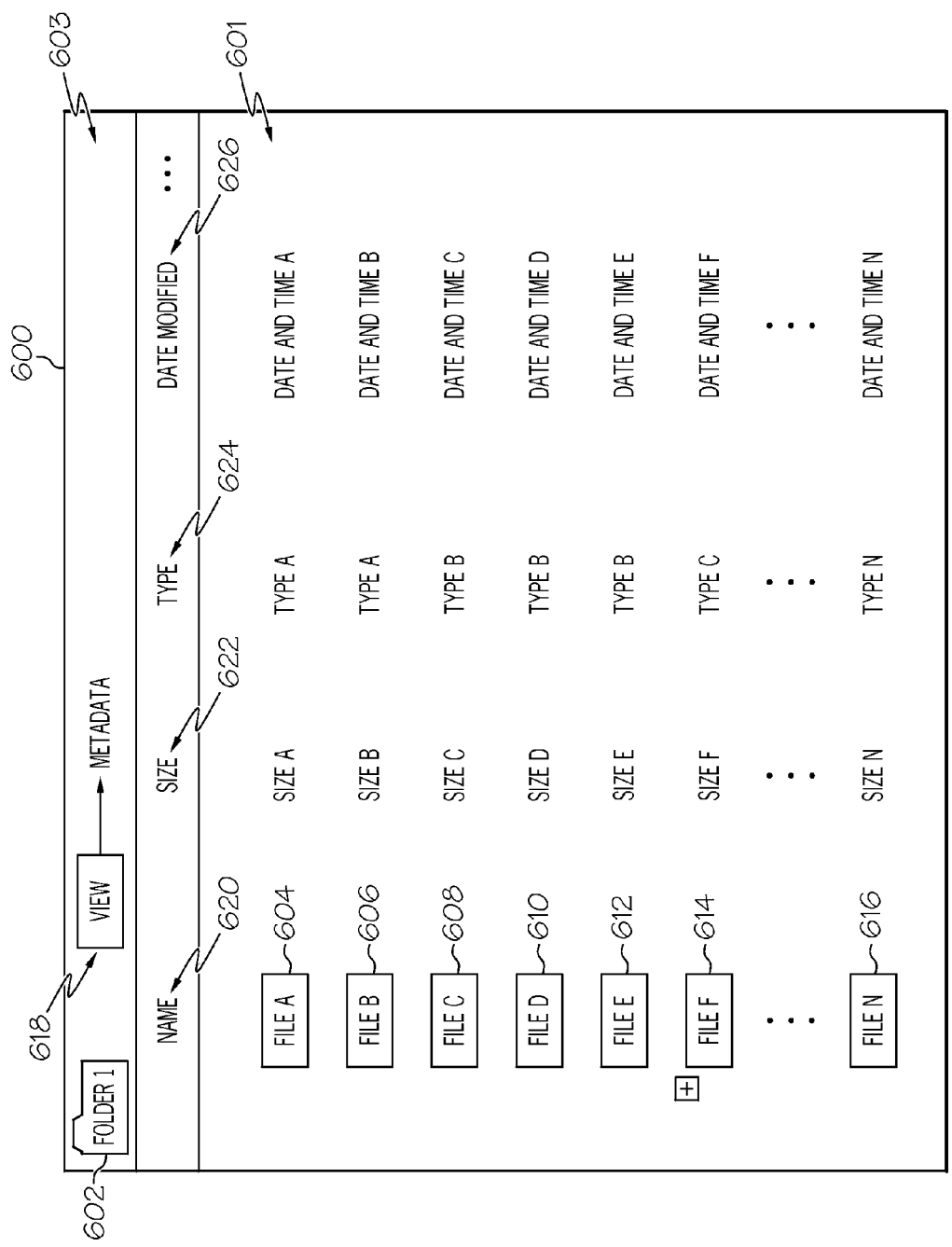
FIG. 6 shows one example of a file managing and navigation interface that allows different viewing modes to be simultaneously applied to different files according to one embodiment of the present invention.

In addition to displaying indexes associated with files, the file explorer 104 also provides an environment where a user is able to select different viewing modes for different files/folders. FIG. 6 shows one example of a viewing mode being applied to all files within a folder. In the example of FIG. 6, a user has selected the folder "Folder 1" 602. Therefore, the presenter 124 displays one or more of the files 604 to 616 being maintained within the folder 602 within a first portion 601 of the interface 600. At least a second portion 603 of the interface 600 identifies the current folder 602 being viewed and provides at least a first viewing mode selection area 618. A user is able to interact with the viewing mode selection area 618 to select one or more viewing modes to be applied to one or more of the displayed files 604 to 616. In the example of FIG. 6 a "metadata" viewing mode has been applied to all of the displayed files. This mode displays various metadata associated with the files such as (but not limited to) the name 620, size 622, type 624, and modification information 626 associated with the files 604 to 616. Other examples of viewing modes include (but are not limited to) a list mode, a thumbnail mode, an icon mode, etc.

In one embodiment, the file viewing manager 116 maintains viewing mode state information associated with each file of the displayed files 604 to 616. For example, FIG. 7 shows one example of viewing mode state information 700 for each of the files displayed in FIG. 6. In particular, FIG. 7 shows a table comprising a first column 702 entitled "File". This column 702 comprises entries 704 identifying a given file currently presented (e.g., currently displayed, hidden, off-screen, etc.) within the interface 600. The files can be identified using any type of identification mechanism such as (but not limited to) a file name, a file ID, or any other form of identification. A second column 706, entitled "Current Viewing State", comprises entries 708 identifying a current viewing state associated with the presented files.

Figure 8:
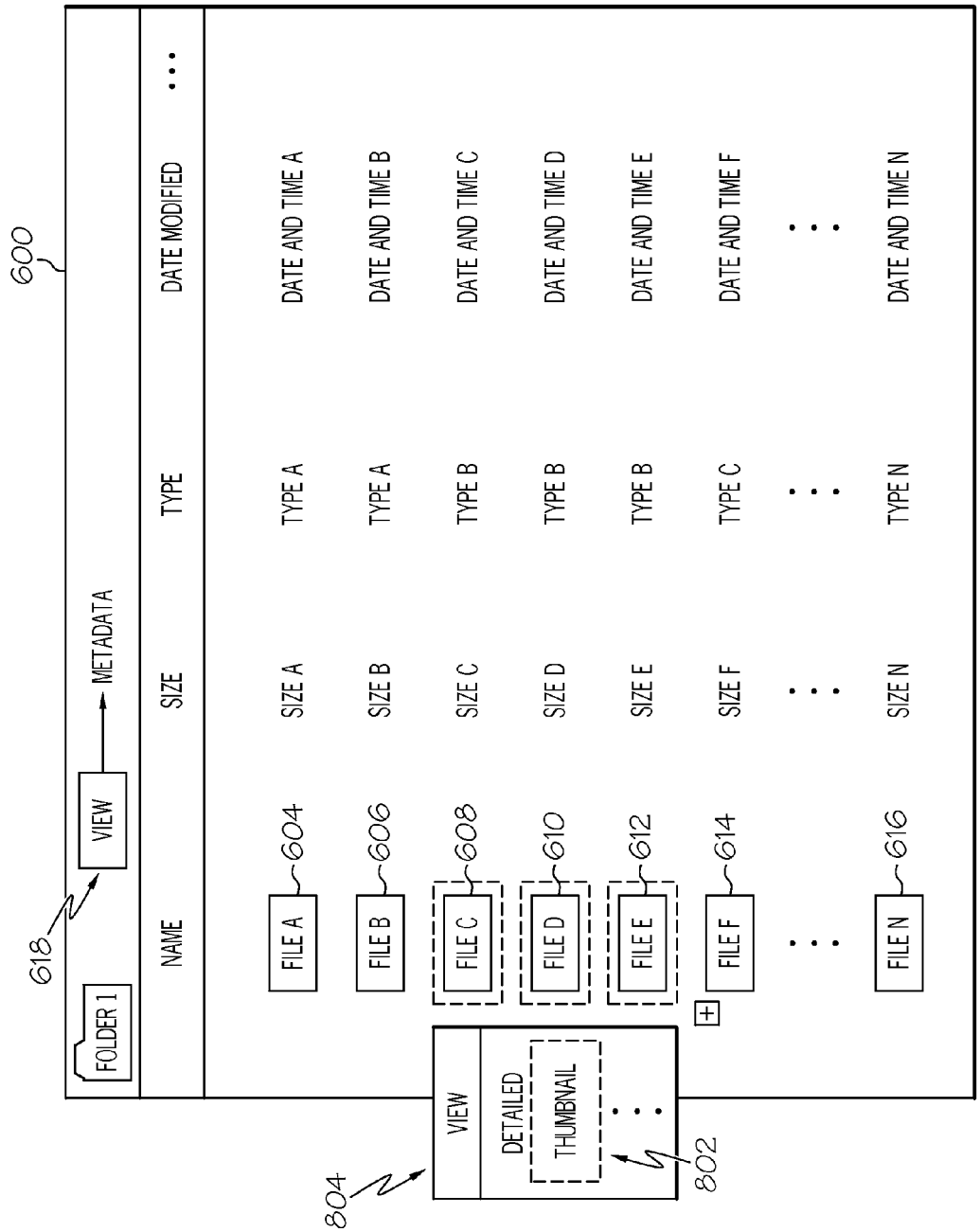
FIG. 8 shows the interface of FIG. 6 after a different viewing mode has been applied to subset of the displayed files according to one embodiment of the present invention.

In one embodiment, the user is able to select different viewing modes for different files. For example, FIG. 8 shows that the user has selected three files File_C 608, File_D 610, and File_E 612, as indicated by the dashed rectangle surrounding each file. FIG. 8 also shows that the user has selected a "thumbnail" viewing mode 802 for each of these selected files as indicated by the dashed rectangle surrounding "thumbnail" in a second viewing mode selection area 804. The file viewing manager 116 displays the second viewing mode selection area 804 in response to an action performed by the user. It should be noted that the user can also utilize the first viewing mode selection area 618 to select a viewing mode for the selected files 608, 610, 612.

The file interaction monitor 120 of the file viewing manager 116 monitors the user's selection of files and also the user's selection of one or viewing modes. The file interaction monitor 120 updates the viewing mode state information 700 based on the user's file selection and viewing mode selection. For example, FIG. 9 shows that the file interaction monitor 120 has updated the viewing mode state information 700 to indicate that the viewing mode of File_C 608, File_D 610, and File_E 612 is now associated with the "thumbnail" viewing mode. Based on the user's selection, the viewing mode applicator 122 applies the "thumbnail" viewing mode only to File_C 608, File_D 610, and File_E 612. Stated differently, the viewing mode state of only File_C 608, File_D 610, and File_E 612 is changed to the "thumbnail" view while the viewing mode state of the remaining files 604, 606, 614, 616 is not changed. Therefore, a first viewing mode is being applied to File_C 608, File_D 610, and File_E 612 while at least a second and different viewing mode is simultaneously being applied to the remaining files 604, 606, 614, 616.

Figure 10:
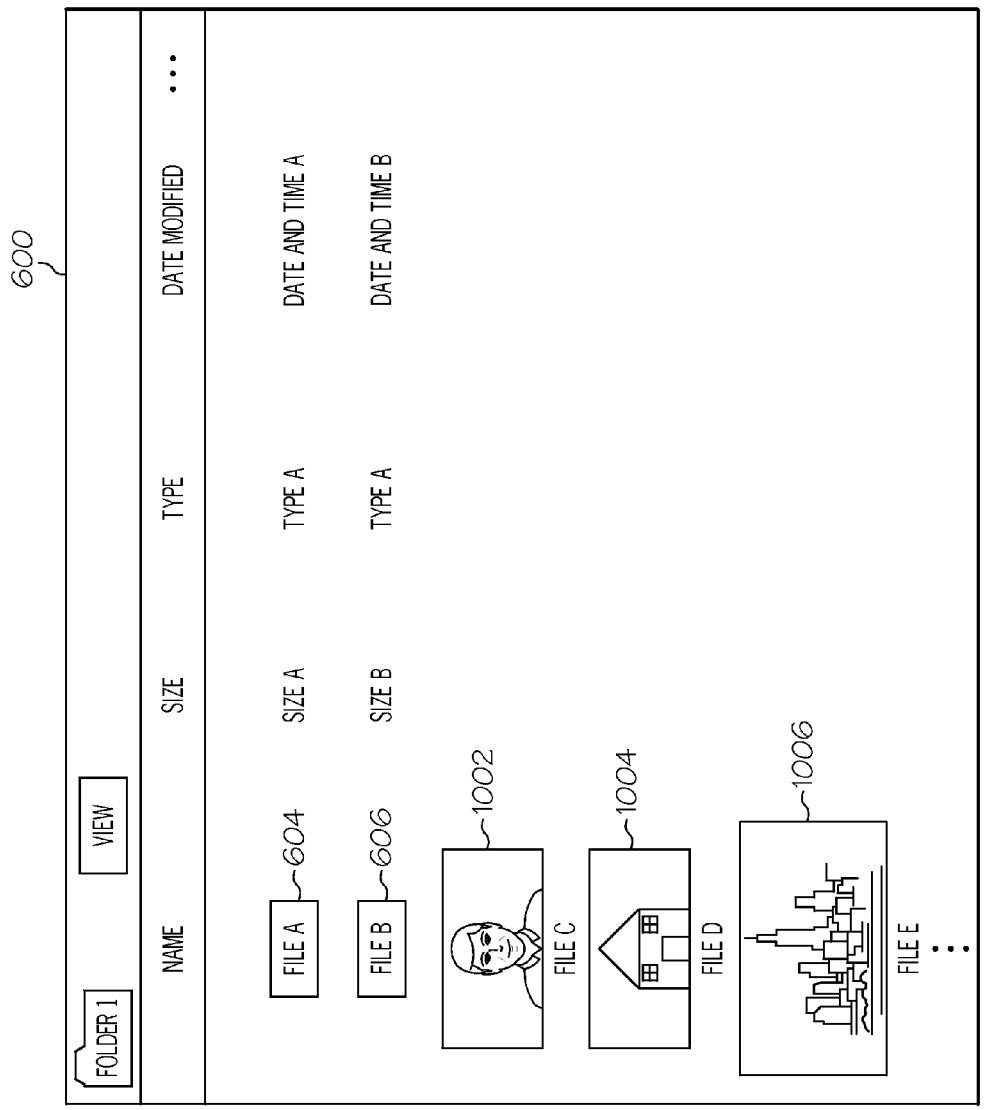
FIG. 10 shows one example of the interface of FIG. 6 presenting a set of files in a first viewing mode and simultaneously presenting the remaining files in a second viewing mode according to one embodiment of the present invention.

For example, FIG. 10 shows the interface 600 after the viewing state of only File_C 608, File_D 610, and File_E 612 has been changed to a "thumbnail" mode. In this example, File_C 608, File_D 610, and File_E 612 are images files. Therefore, thumbnails (e.g., a reduced-size version of an image(s) 1002, 1004, 1006 for each of these images have been displayed. FIG. 10 also shows that the viewing states of remaining files 604, 606 that were not selected by the user were not changed and remain in the "metadata" mode.

Also, in one embodiment, default views can be associated with a given folder 602. For example, a folder can be associated with a default viewing state based on one or more thresholds. In this example, the file viewing manager 116 compares metadata such as (but not limited to) creation (or modification) date of each file to a given threshold. Any files that have a creation date prior to the threshold are presented in a first viewing mode (e.g., metadata mode) when the folder 602 is first opened by the user. Any files that have a creation date after the threshold are presented in a second viewing mode (e.g., thumbnail mode) when the folder 602 is first opened by the user. It should be noted that other metadata and viewing modes are applicable as well.

Figure 11:
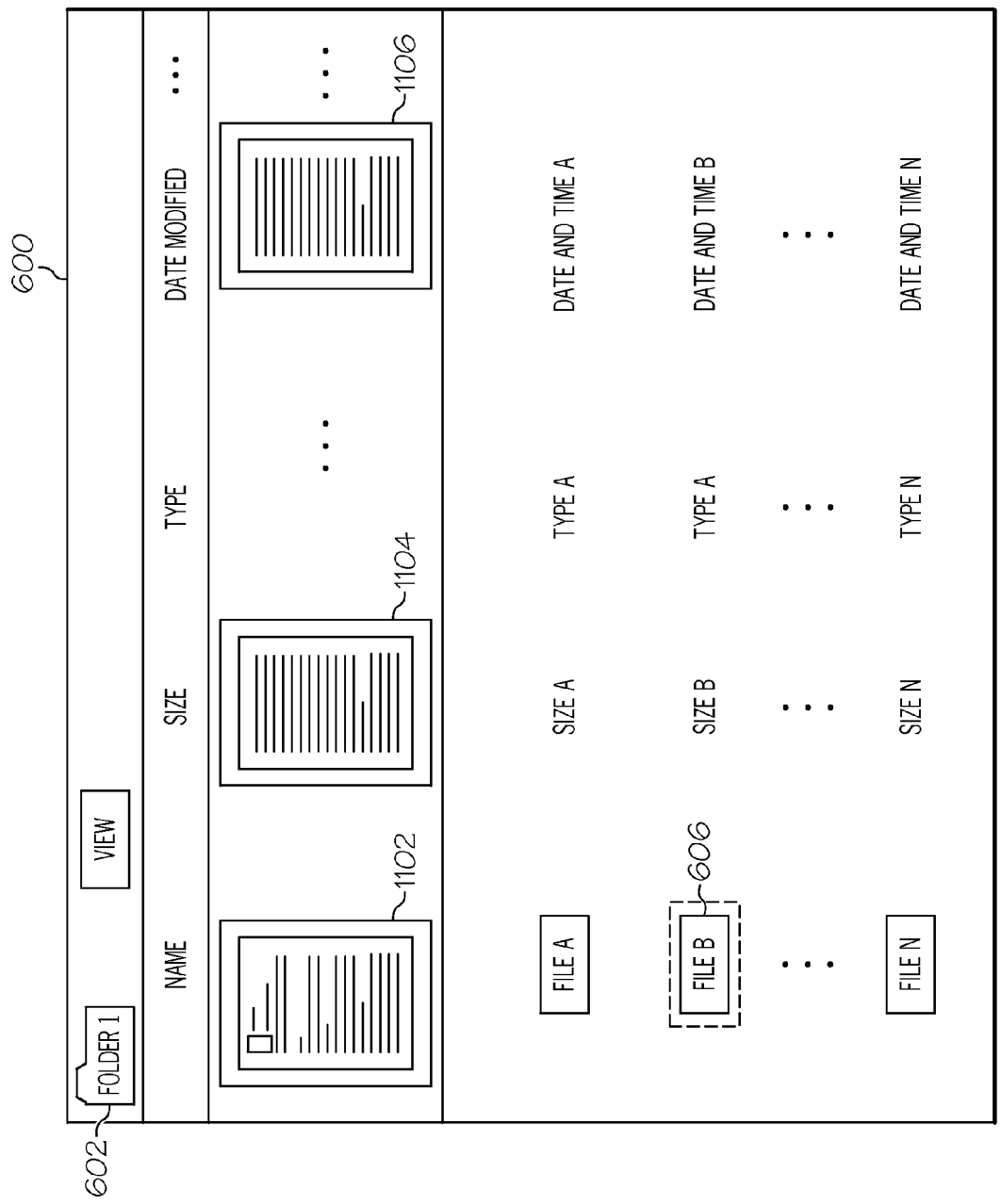
FIG. 11 shows one example of the interface of FIG. 6 presenting a plurality of thumbnails for a file in a first viewing mode and simultaneously presenting the remaining files in a second viewing mode according to one embodiment of the present invention.

It should also be noted that in a "thumbnail" view mode if a file comprises contents requiring multiple thumbnails (e.g., a document) the file viewing manager displays multiple thumbnails for the file. FIG. 11 shows an example where multiple thumbnails 1102, 1104, 1106 are displayed within the interface 600 for a single file 606 selected by the user (as indicated by the dashed rectangle). In this example, the file 606 associated with the thumbnails 1102, 1104, 1106 is a document comprising multiple pages (or sections as identified by its index 114). In this embodiment, the file viewing manager 116 analyzes the content set 110 of the file 606, and separate thumbnail 1102, 1104, 1106 for two or more of these pages or sections. The user is able to select one of these thumbnails and have the file opened at the page/section corresponding to the selected thumbnail, similar to that discussed above. If there are more thumbnails than can be displayed in the interface 600 scroll bars (not shown) can be presented within the interface 1000 to scroll the view so that these additional thumbnails can be seen.

Operational Flow Diagrams

Figure 12:
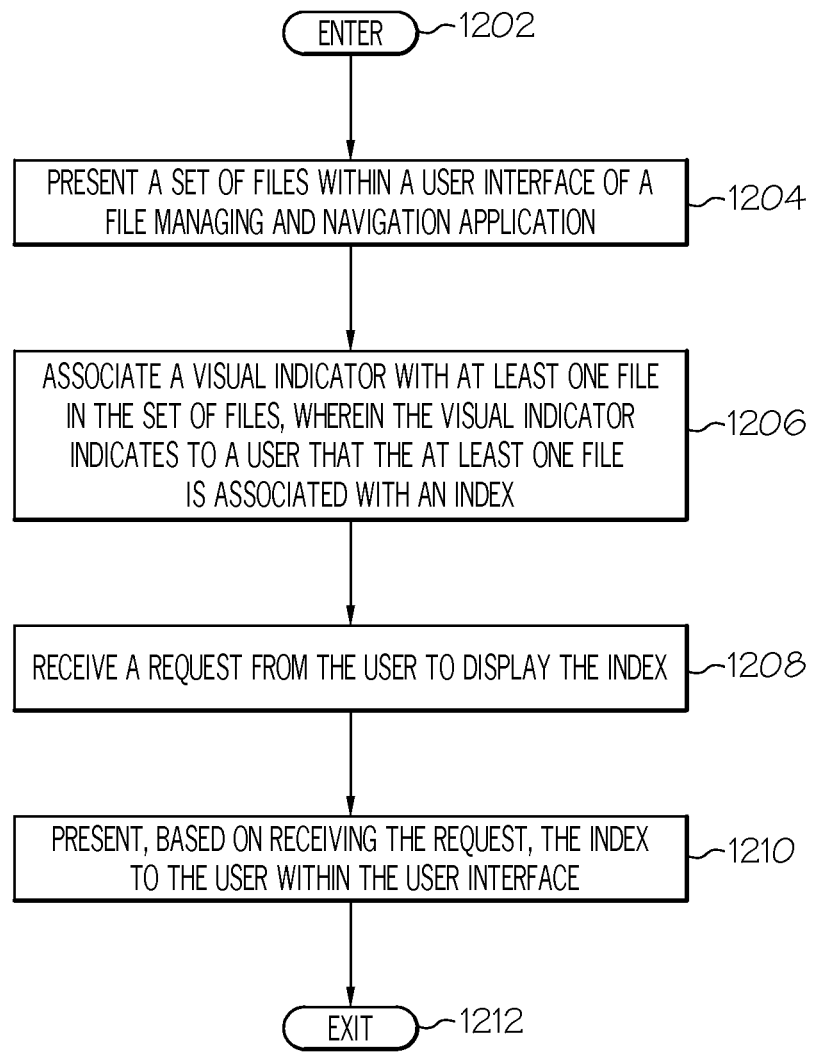
FIG. 12 is an operational flow diagram illustrating one example of a process for presenting file indexes within a file managing and navigation interface according to one embodiment of the present invention.
Figure 13:
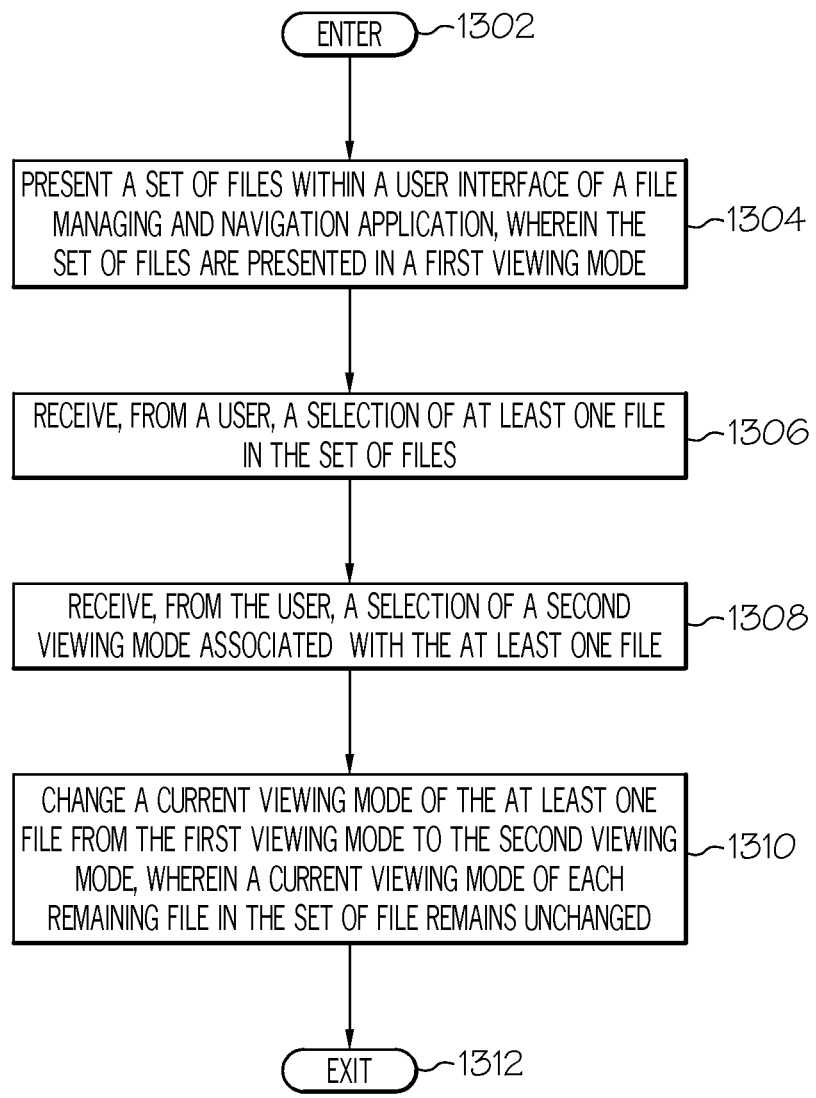
FIG. 13 is an operational flow diagram illustrating one example of a process for managing a viewing mode of a file managing and navigation interface according to one embodiment of the present invention.

FIGS. 12-13 illustrate operational flow diagrams for various embodiments of the present invention. The methods depicted in FIGS. 12-13 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the embodiments. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

FIG. 12 is an operational flow diagram illustrating one example of a process for presenting file indexes within a file managing and navigation interface. The operational flow diagram of FIG. 12 begins at step 1202 and flows directly to step 1204. The file viewing manager 126, at step 1204, presents a set of files 106 within a user interface 400 of a file managing and navigation application 104. The file viewing manager 126, at step 1206, associates a visual indicator 328 with at least one file 302 in the set of files 106. The visual indicator 328 indicates to a user that the at least one file 302 is associated with an index 200. The index 200 comprises a set of index components 202 to 216 associated with a content set 120 of the at least one file 302. The file viewing manager 126, at step 1208, receives a request from the user to display the index 200. The file viewing manager 126, at step 1210, presents the index 200 to the user within the user interface 300 based on receiving the request. The control flow exits at step 1212.

FIG. 13 is an operational flow diagram illustrating one example of a process for managing a viewing mode of a file managing and navigation interface. The operational flow diagram of FIG. 13 begins at step 1302 and flows directly to step 1304. The file viewing manager 116, at step 1304, presents a set of files 106 within a user interface 300 of a file managing and navigation application 104. The set of files 106 are presented in a first viewing mode. The file viewing manager 116, at step 1306, receives, from a user, a selection of at least one file 606 in the set of files 106. The file viewing manager 116, at step 1308, receives, from the user, a selection of a second viewing mode associated with the at least one file 606. The file viewing manager 116, at step 1310, changes a current viewing mode of the at least one file from the first viewing mode to the second viewing mode. The current viewing mode of each remaining file in the set of files 106 remains unchanged. The control flow exits at step 1312.

Information Processing System

Figure 14:
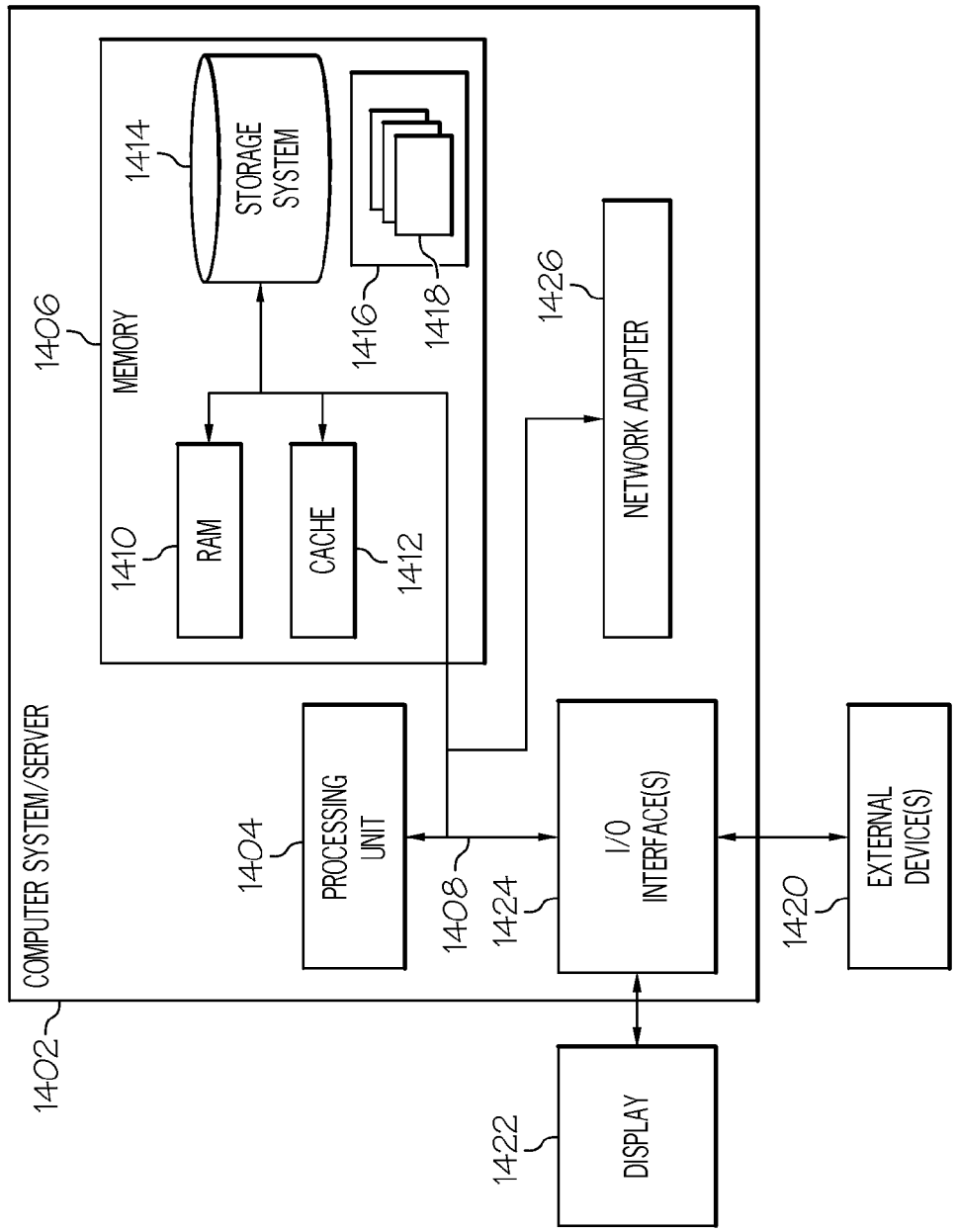
FIG. 14 is a block diagram illustrating a detailed view of an information processing system according to one embodiment of the present invention.

FIG. 14 illustrates one example of an information processing system that can be utilized in embodiments of the present invention. The information processing system 1402 is based upon a suitably configured processing system configured to implement one or more embodiments of the present invention (e.g., the information processing system 102 of FIG. 1). Any suitably configured processing system can be used as the information processing system 1402 in embodiments of the present invention. The components of the information processing system 1402 can include, but are not limited to, one or more processors or processing units 1404, a system memory 1406, and a bus 1408 that couples various system components including the system memory 1406 to the processor 1404.

The bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 14, the main memory 1406 includes the file explorer 104, the file viewing manager 116 and its components, the files 106, the indices 114, index tracking information 400, and the viewing mode state information 700. The file explorer 104 and the file viewing manager 116 (and its components) can also reside within the processor 1404, or be a separate hardware component. The system memory 1406 can also include computer system readable media in the form of volatile memory, such as random access memory (RAM) 1410 and/or cache memory 1412. The information processing system 1402 can further include other removable/non-removable, volatile/non-volatile computer system storage media. By way of example only, a storage system 1414 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1408 by one or more data media interfaces. The memory 1406 can include at least one program product having a set of program modules that are configured to carry out the functions of an embodiment of the present invention.

Program/utility 1416, having a set of program modules 1418, may be stored in memory 1406 by way of example, and not limitation, as well as an operating system, one or more application programs (e.g., applications 108), other program modules, and program data. Each of the operating system, one or more application programs, other program modules, and program data or some combination thereof, may include an implementation of a networking environment. Program modules 1418 generally carry out the functions and/or methodologies of embodiments of the present invention.

The information processing system 1402 can also communicate with one or more external devices 1420 such as a keyboard, a pointing device, a display 1422, etc.; one or more devices that enable a user to interact with the information processing system 1402; and/or any devices (e.g., network card, modem, etc.) that enable computer system/server 1402 to communicate with one or more other computing devices. Such communication can occur via I/O interfaces 1424. Still yet, the information processing system 1402 can communicate with one or more networks such as a local area network (LAN), a general wide area network (WAN), and/or a public network (e.g., the Internet) via network adapter 1426. As depicted, the network adapter 1426 communicates with the other components of information processing system 1402 via the bus 1408. Other hardware and/or software components can also be used in conjunction with the information processing system 1402. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with an information processing system, for managing a viewing mode of a file managing and navigation interface, the method comprising:

presenting a set of files within a user interface of a file managing and navigation application, wherein the set of files are presented in a first viewing mode, wherein a viewing mode for the user interface determines how one or more icons, symbols, and text representing each file of the set of files is displayed within the user interface;

receiving, from a user, a selection of at least one file in the set of files;

receiving, from the user, a selection of a second viewing mode associated with the at least one file, the second viewing mode different than the first viewing mode; and changing a current viewing mode of the at least one file from the first viewing mode to the second viewing mode by altering a display of one or more icons, symbols, and text representing the at least one file, wherein a current viewing mode of each remaining file in the set of files remains in the first viewing mode such that the at least one file is presented in the second viewing mode and each remaining file is presented in the first viewing mode within the user interface concurrently.

2. The method of claim 1, further comprising:
updating a set of viewing mode state information associated with the set of files to indicate that the at least one file is currently in a second viewing mode state; and
updating the set of viewing mode state information associated with each remaining file in the set of files to indicate that each of the remaining files is currently in a first viewing mode state.

3. The method of claim 1, wherein the second viewing mode presents the at least one file within the user interface as a thumbnail.

4. The method of claim 1, wherein changing the current viewing mode of the at least one file comprises:
identifying a content set of the at least one file; and
presenting the at least one file within the user interface as a plurality of thumbnails, wherein each of the plurality of thumbnails corresponds to a portion of the content set of the at least one file.

5. The method of claim 4, further comprising:
receiving, from the user, a selection of a thumbnail from the plurality of thumbnails; and
opening the at least one file at a page associated with the thumbnail that was selected.

6. The method of claim 1, wherein presenting a set of files further comprises:
determining that the user has opened a virtual folder comprising the set of files;
identifying a creation date of each of the set of files;
comparing, for each of the set of files, the creation date to a given threshold;
presenting a first subset of the set of files in the first viewing mode based on the creation date of each file in the first subset being prior to the given threshold; and
presenting a second subset of the set of files in a viewing mode that is different than the first viewing mode based on the creation date of each file in the second subset being after the given threshold.

7. A non-transitory computer program storage product for managing a viewing mode of a file managing and navigation interface, the computer program storage product comprising instructions configured to perform a method comprising:
presenting a set of files within a user interface of a file managing and navigation application, wherein the set of files are presented in a first viewing mode wherein a viewing mode for the user interface determines how one or more icons, symbols, and text representing each file of the set of files is displayed within the user interface;
receiving, from a user, a selection of at least one file in the set of files;
receiving, from the user, a selection of a second viewing mode associated with the at least one file, the second viewing mode different than the first viewing mode; and
changing a current viewing mode of the at least one file from the first viewing mode to the second viewing mode by altering a display of one or more icons, symbols, and text representing the at least one file, wherein a current viewing mode of each remaining file in the set of files remains in the first viewing mode such that the at least one file is presented in the second viewing mode and each remaining file is presented in the first viewing mode within the user interface concurrently.

8. The computer program storage product of claim 7, wherein the second viewing mode presents the at least one file within the user interface as a thumbnail.

9. The computer program storage product of claim 7, wherein changing the current viewing mode of the at least one file comprises:
identifying a content set of the at least file; and
presenting the at least one file within the user interface as a plurality of thumbnails, wherein each of the plurality of thumbnails corresponds to a portion of the content set of the least one file.

10. The computer program storage product of claim 9, wherein the method further comprises:
receiving, from the user, a selection of a thumbnail from the plurality of thumbnails; and
opening the at least one file at a page associated with the thumbnail that was selected.

11. The computer program storage product of claim 7, wherein presenting a set of files further comprises:
determining that the user has opened a virtual folder comprising the set of files;
identifying a creation date of each of the set of files;
comparing, for each of the set of files, the creation date to a given threshold;
presenting a first subset of the set of files in the first viewing mode based on the creation date of each file in the first subset being prior to the given threshold; and
presenting a second subset of the set of files in a viewing mode that is different than the first viewing mode based on the creation date of each file in the second subset being after the given threshold.

* * * * *